(12) United States Patent
Robbin et al.

(10) Patent No.: US 9,038,813 B2
(45) Date of Patent: May 26, 2015

(54) DEVICE FOR TRANSPORTING VEHICLE BODIES

(75) Inventors: Joerg Robbin, Ammerbuch (DE); Thomas Hennig, Stuttgart (DE)

(73) Assignee: EISENMANN AG, Boeblingen (DE)

( * ) Notice: Subject to any disclaimer, the term of this patent is extended or adjusted under 35 U.S.C. 154(b) by 0 days.

(21) Appl. No.: 13/821,906

(22) PCT Filed: Aug. 19, 2011

(86) PCT No.: PCT/EP2011/004178
§ 371 (c)(1),
(2), (4) Date: Mar. 8, 2013

(87) PCT Pub. No.: WO2012/031679
PCT Pub. Date: Mar. 15, 2012

(65) Prior Publication Data
US 2013/0313075 A1    Nov. 28, 2013

(30) Foreign Application Priority Data

Sep. 10, 2010   (DE) .................... 10 2010 045 013

(51) Int. Cl.
*B65G 15/14* (2006.01)
*B65G 17/12* (2006.01)
*B62D 65/18* (2006.01)

(52) U.S. Cl.
CPC ............... *B65G 17/12* (2013.01); *B62D 65/18* (2013.01)

(58) Field of Classification Search
CPC .................... B65G 17/12; B65D 65/18
USPC ........ 198/604, 469.1, 474, 487.1, 692, 688.1, 198/867.09, 803.12, 465.1, 465.2, 465.3
See application file for complete search history.

(56) References Cited

U.S. PATENT DOCUMENTS

| 1,299,500 | A | * | 4/1919 | Moxham .................... 366/331 |
| 1,792,533 | A | * | 2/1931 | Francis ........................ 104/25 |
| 4,836,359 | A | * | 6/1989 | Walter ................... 198/867.14 |
| 6,250,457 | B1 | * | 6/2001 | Spurck et al. ............... 198/845 |

FOREIGN PATENT DOCUMENTS

| DE | 708 240 C | 7/1941 |
| DE | 29 16 818 A1 | 11/1980 |
| DE | 10 2008 026 317 A1 | 12/2009 |
| DE | 10 2009 004 433 A1 | 7/2010 |
| EP | 1 557 378 A1 | 7/2005 |

* cited by examiner

*Primary Examiner* — William R Harp
(74) *Attorney, Agent, or Firm* — Factor Intellectual Property Law Group, Ltd.

(57) ABSTRACT

A device for transporting vehicle bodies, on which standardized holding components are provided. A guide device is provided for at least one continuous drive train which having a driving side and a slack side, and having a first return element and at least one second return element around which the at least one continuous drive train circulates. The at least one continuous drive train supports a plurality of coupling elements which are arranged and aligned in such a manner that they can work together with the standardized holding components provided on the vehicle body.

5 Claims, 12 Drawing Sheets

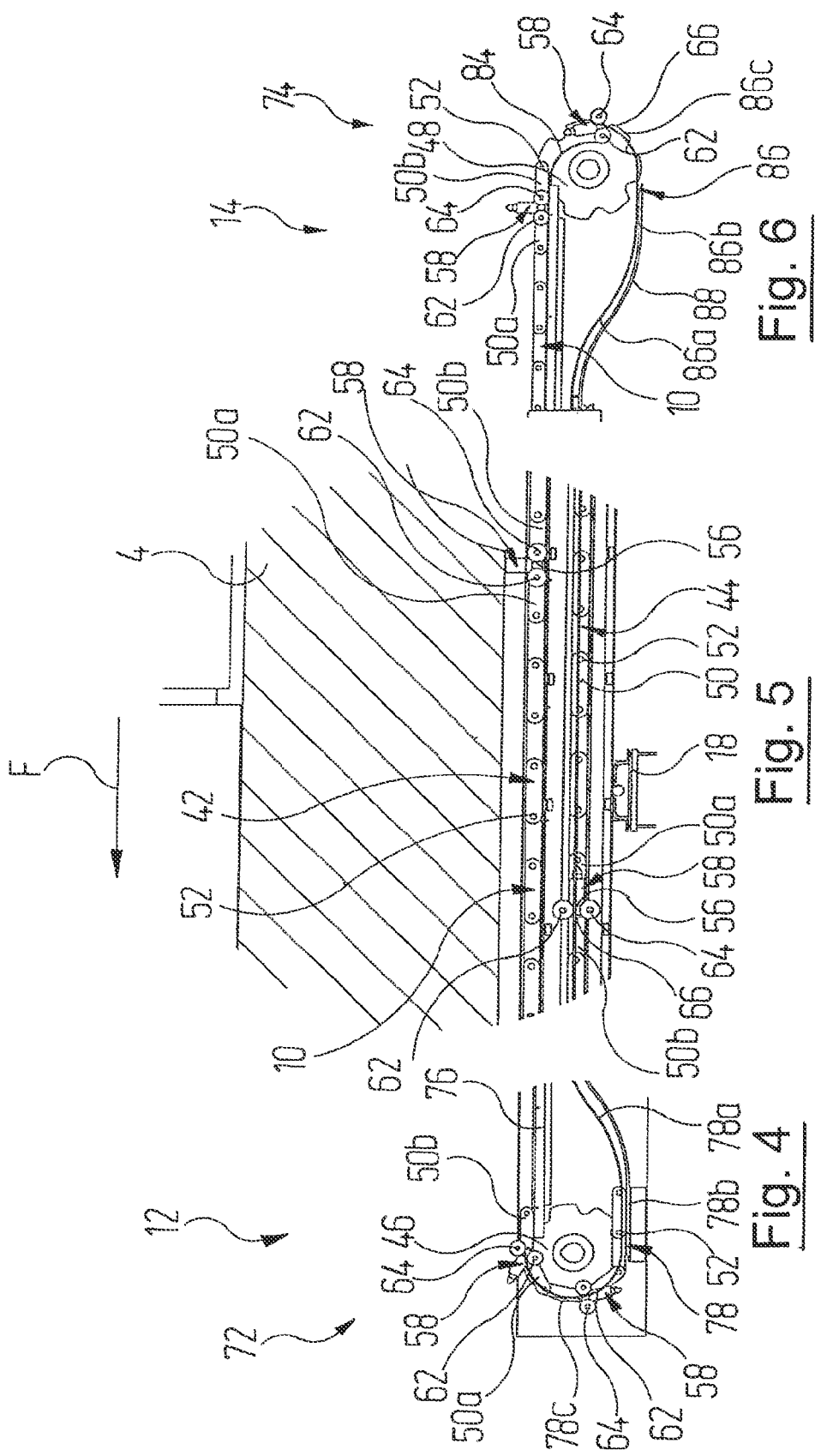

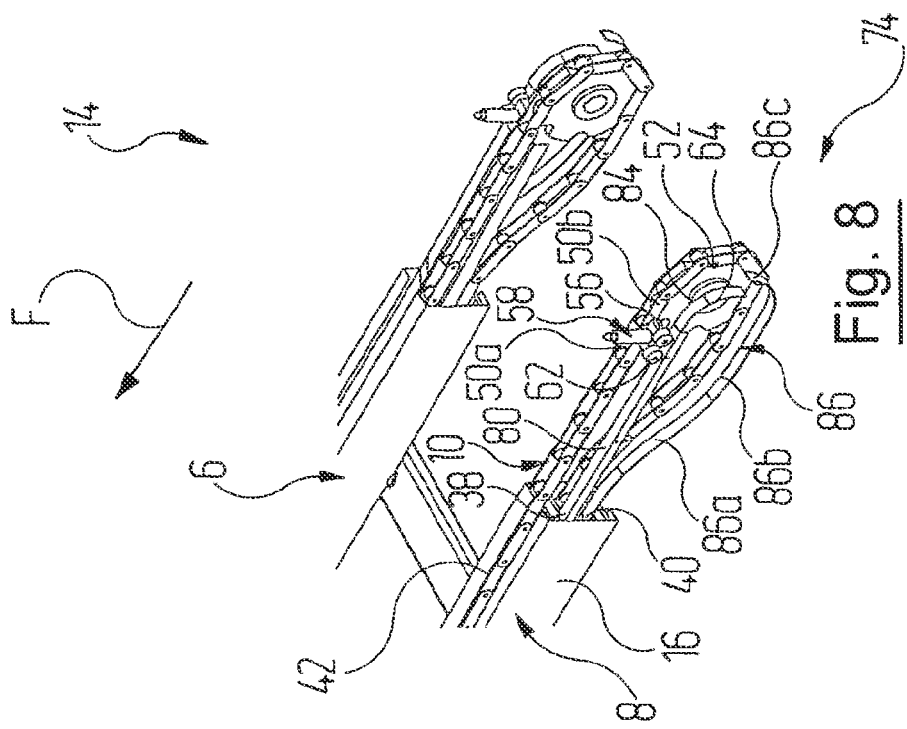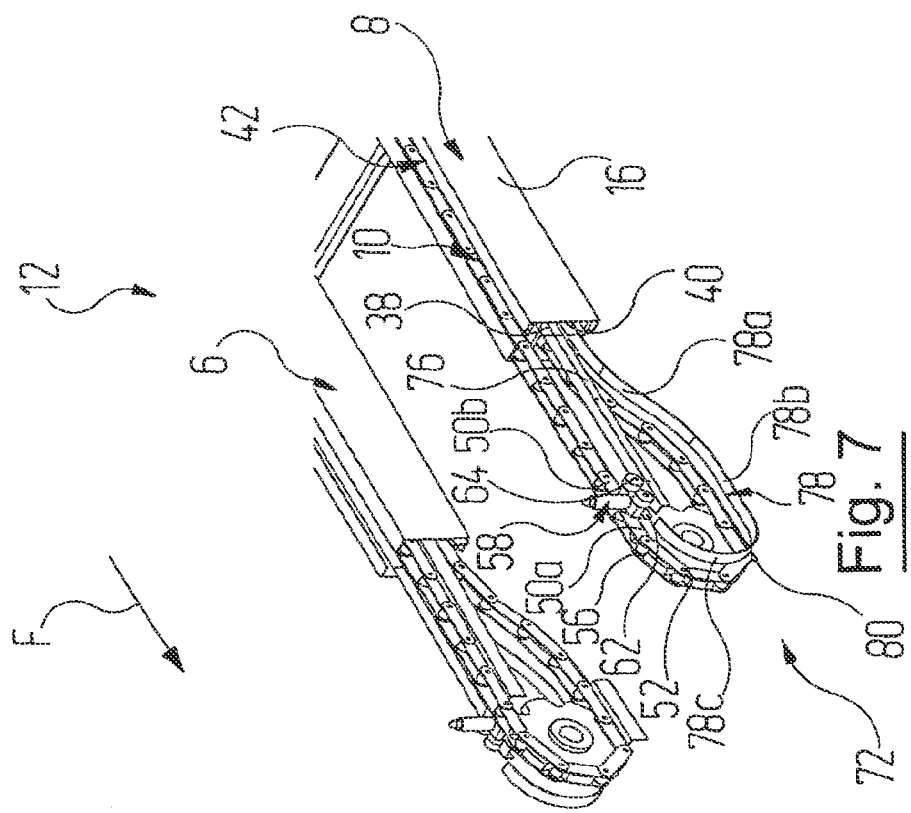

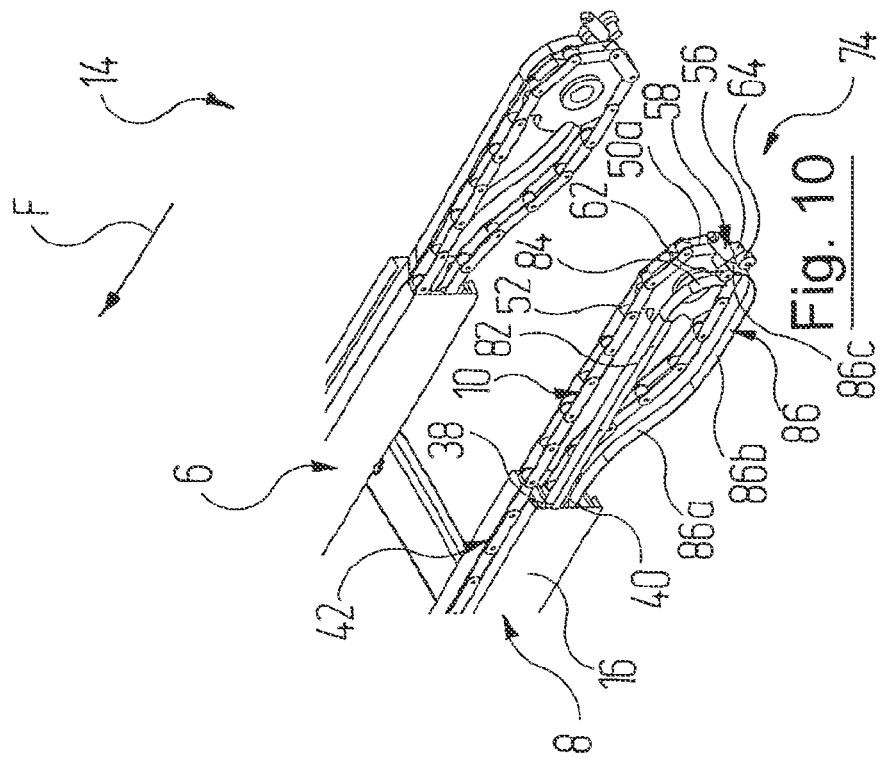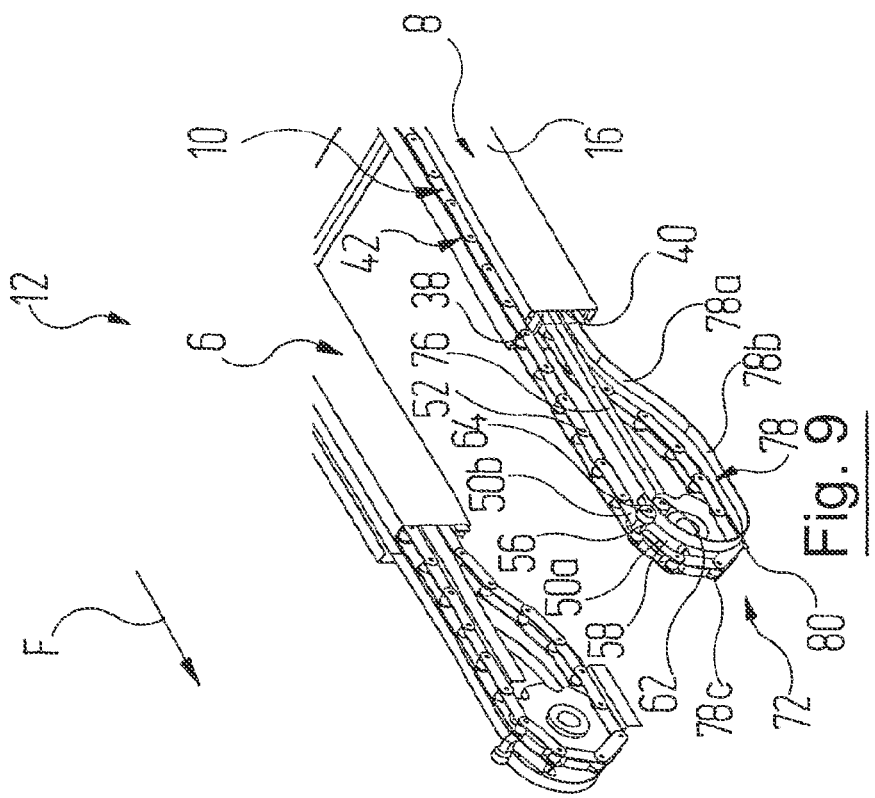

DEVICE FOR TRANSPORTING VEHICLE BODIES

RELATED APPLICATIONS

This application claims the filing benefit of International Patent Application No. PCT/EP2011/004178, filed Aug. 19, 2011, which claims the filing benefit of German Patent Application No. 10 2010 045 013.8 filed Sep. 10, 2010, the contents of both of which are incorporated herein by reference.

FIELD OF THE INVENTION

The invention relates to a device for conveying vehicle bodies on which standardised holding components are present, having
a) at least one continuous drive train which forms a load-carrying strand and a return strand;
b) a guide device for the at least one continuous drive train, which comprises a first deflection element and at least one second deflection element by way of which the at least one continuous drive train revolves.

BACKGROUND OF THE INVENTION

Conveyor devices of this type are used in the automotive industry to convey vehicle bodies between, and in particular also in, individual processing or treatment stations.

The vehicle bodies here are conventionally secured in each case to a so-called skid, which generally comprises two support runners with which the skid is supported for example on a roller conveyor. Present-day vehicle bodies are already produced with holding components which are standardised and matched to the skid technology. These holding components of the vehicle bodies are mostly holding plates on their floor. These holding plates cooperate with correspondingly adapted locking elements on the skid, which are likewise known per se and by way of which a vehicle body is secured to a skid.

To drive the skid, this is coupled to the continuous drive train which can be constructed, for example, as a conveyor chain and whereof the load-carrying strand extends accordingly parallel next to the roller conveyor. In one variant, the skid can also lie with its support runners on a respective continuous drive train, i.e. for example on a respective conveyor chain.

In the individual treatment stations, a skid of this type is in most cases subjected to the same treatment as the vehicle body secured to it. If a vehicle body on a skid is guided for example through a drier, the associated skid is also heated each time with each vehicle body in order to then be cooled again with the vehicle body. As a result, a considerable proportion of the energy for each drying procedure is used in heating and cooling the skid.

In treatment zones in which the skid is not subjected to any direct treatment, it still has to be carried along with the vehicle body. The total mass of the vehicle body and skid to be conveyed is therefore considerably higher than the mass of a vehicle body alone. For example, a vehicle body with a weight of approximately 400 kg is conveyed on a skid which weighs approximately 150 kg. Since greater masses have to be moved, more energy also has to be used for transporting a vehicle body and skid than for a vehicle body alone.

All in all, in the case of commercially known conveyor devices of the type mentioned at the outset which cooperate with skids, the total energy balance in terms of the vehicle bodies to be treated is adversely affected and the total operating costs of the system are therefore increased.

It is therefore an object of the invention to provide a device of the type mentioned at the outset, which takes these considerations into account.

SUMMARY OF THE INVENTION

This object may be achieved in a device of the type mentioned at the outset in that,
c) the at least one continuous drive train carries a plurality of coupling elements which are arranged and aligned in such a way that they can cooperate with the standardised holding components present on the vehicle body.

Therefore, according to the invention, a vehicle body to be transported can be conveyed directly by the device without a supplementary carrying structure such as a skid. The vehicle body cooperates directly with the existing coupling elements and is carried by these when the vehicle body is conveyed by the conveyor device.

It is particularly advantageous if at least two continuous drive trains are present, whereof the load-carrying strands extend parallel to one another and form a conveying plane, in particular a horizontal conveying plane, with the coupling elements.

It is favourable here if the coupling elements extend vertically upwards beyond the continuous drive train, at least in the region of the load-carrying strand of the continuous drive train. This ensures a safety gap between the drive train and the vehicle body.

The coupling elements can be constructed for example similarly to the known locking elements, such as those present on skids. For example, the coupling elements can advantageously be constructed as support pins.

It is desirable for the overall height of the conveyor device to be as small as possible. It is therefore preferable that
a) the coupling elements are connected to the continuous drive train such that they can tilt about an axis;
b) means are present which are configured in such a way that the coupling elements are carried by the load-carrying strand in an operating position and by the return strand in an idle position which is tilted by comparison, wherein the means
ba) comprise a tilting device at a first end of the continuous drive train, by means of which the coupling elements are tilted from their operating position into the idle position;
bb) comprise a righting device at a second end of the continuous drive train, by means of which the coupling elements are tilted from their idle position into the operating position.

If the coupling elements are constructed for example as upwardly projecting support pins on the load-carrying strand, they can be tilted at the deflection elements and carried along by the return strand in an idle position, which requires a smaller overall height. This is especially desirable when the load-carrying strand and the return strand of the continuous drive train extend above one another.

It is particularly favourable here if the tilting axis of the coupling elements extends horizontally and perpendicularly to the direction of revolution when the device is in operation and the tilting device and the righting device each comprise rail elements by means of which the coupling elements carry out the tilting movement in positively driven manner. It is thus possible for the position of the coupling elements to be altered without the need for additional setting elements which would themselves require a separate drive.

As an alternative to such tilting mechanisms, it can be advantageous if the first and the second deflection element are mounted such that they are rotatable about mutually parallel axes which extend at an angle other than 0° with respect to a horizontal plane. The necessary overall height here becomes smaller and smaller as the angle to the horizontal reference plane increases.

The axes of the first and the second deflection element extend preferably vertically. The load-carrying strand and the return strand of the continuous drive train then lie next to one another in a horizontal plane.

In this case, the coupling elements are preferably mounted on the upper side of the continuous drive train. The continuous drive train is then best able to carry the load.

If the continuous drive train runs on or in a type of rail, it is necessary to overcome relatively high friction forces. The continuous drive train is therefore preferably supported on its underside by a plurality of rollers which are carried along.

In terms of the load bearing capacity, it is particularly advantageous if a roller is arranged opposite a coupling element on the continuous drive train in each case.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Exemplary embodiments of the invention are explained in more detail below with reference to the drawings, which show:

FIG. 4 an enlarged detail of the drive end shown in FIG. 2 of the drive unit which can be seen therein;

FIG. 5 an enlarged detail of the conveyor chain shown in FIG. 2 in the region of the front vehicle body shown therein;

FIG. 6 an enlarged detail of the bearing end shown in FIG. 2 of the drive unit shown therein;

FIGS. 7, 9 and 11 the drive ends of both drive units of the carrying-chain conveyor in a perspective view, wherein three phases of a tilting procedure of support pins for a vehicle body are shown;

FIGS. 8, 10 and 12 views corresponding to FIGS. 7, 9 and 11 of the bearing ends of both drive units of the carrying-chain conveyor in a perspective view, wherein three phases of a righting procedure of the support pins are shown;

FIG. 16 an enlarged detail corresponding to FIG. 5 of the conveyor chain shown in FIG. 14 in the region of the front vehicle body shown therein, wherein a guide profile is shown partially cut through;

DETAILED DESCRIPTION OF THE PRESENT INVENTION

Figure 1:
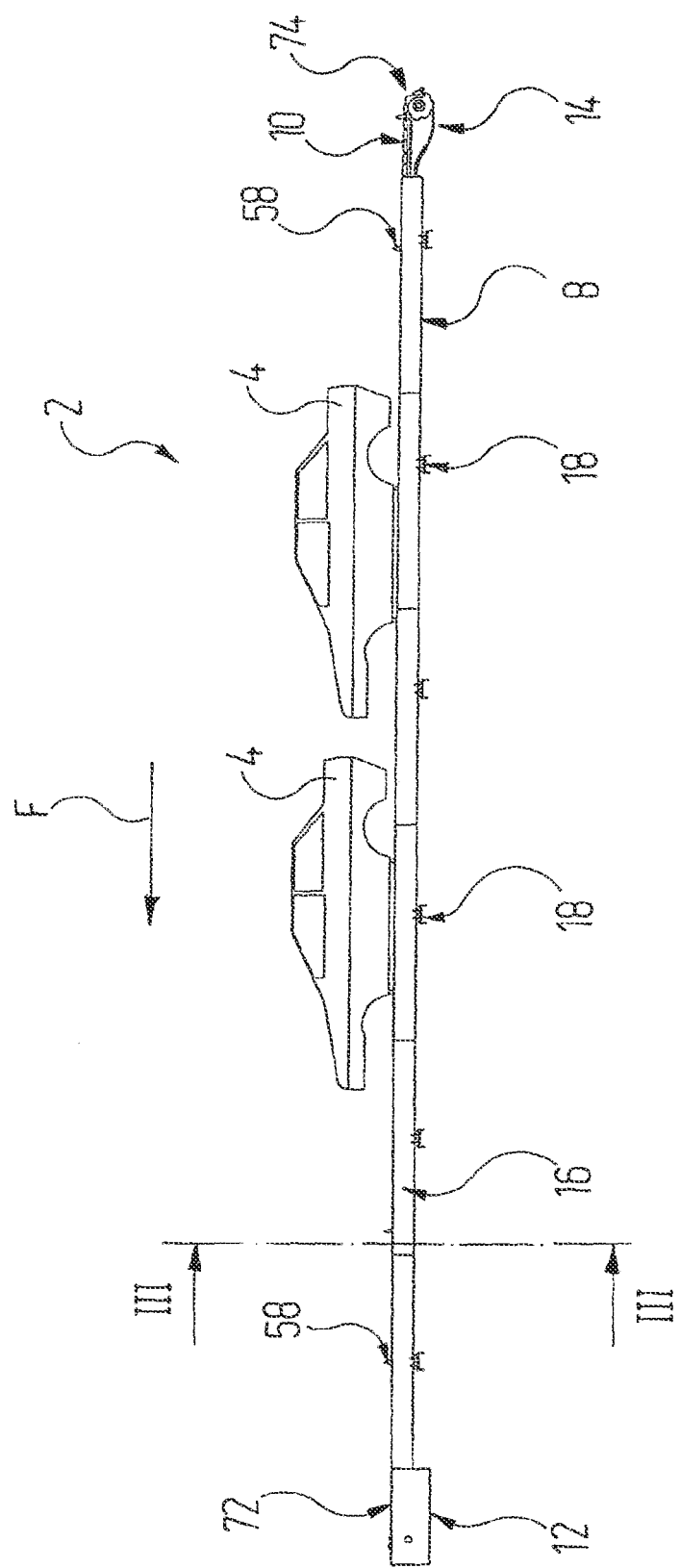
FIG. 1 a side view of a carrying-chain conveyor with tiltable support pins as a first exemplary embodiment, comprising two drive units which each have a respective conveyor chain revolving between a drive end and a bearing end of the respective drive unit.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

In FIGS. 1 to 12, a carrying-chain conveyor as a first exemplary embodiment is denoted as a whole by 2, which carrying-chain conveyor is to be used for conveying vehicle bodies 4 for example through a system for surface treatment or individual treatment zones of such a system. The conveying direction is denoted by an arrow F.

For this, the carrying-chain conveyor 2 comprises two mutually parallel-extending drive units 6 and 8 for transporting vehicle bodies 4. The drive units 6, 8 are of a mirror-inverted construction with respect to a vertical plane extending parallel to them, although they are otherwise the same in design and, for the sake of simplicity, are therefore only described below using the example of the drive unit 8, which is arranged on the left in the conveying direction F. The description of this applies analogously to the drive unit 6.

The drive unit 8 guides a continuous drive train in the form of a continuous conveyor chain 10, which revolves between a drive end 12 and a bearing end 14 of the drive unit 8. To this end, the drive unit 8 comprises a guide profile 16 for the conveyor chain 10, which is secured to the floor by way of a plurality of supporting structures 18 which also support the corresponding guide profile 16 of the drive unit 8. This is shown in FIG. 3.

The guide profile 16 extends between the drive end 12 and the bearing end 14 of the drive unit 8 and comprises a first side plate 20 and a second side plate 22, each having a planar vertical portion 24 and 26 from which a respective upper flange 28 and 30 is bent at a right angle at the upper longitudinal end. These two flanges 28, 30 face one another, leaving a longitudinal slot 32 between them which extends over the entire length of the guide profile 16.

Figure 3:
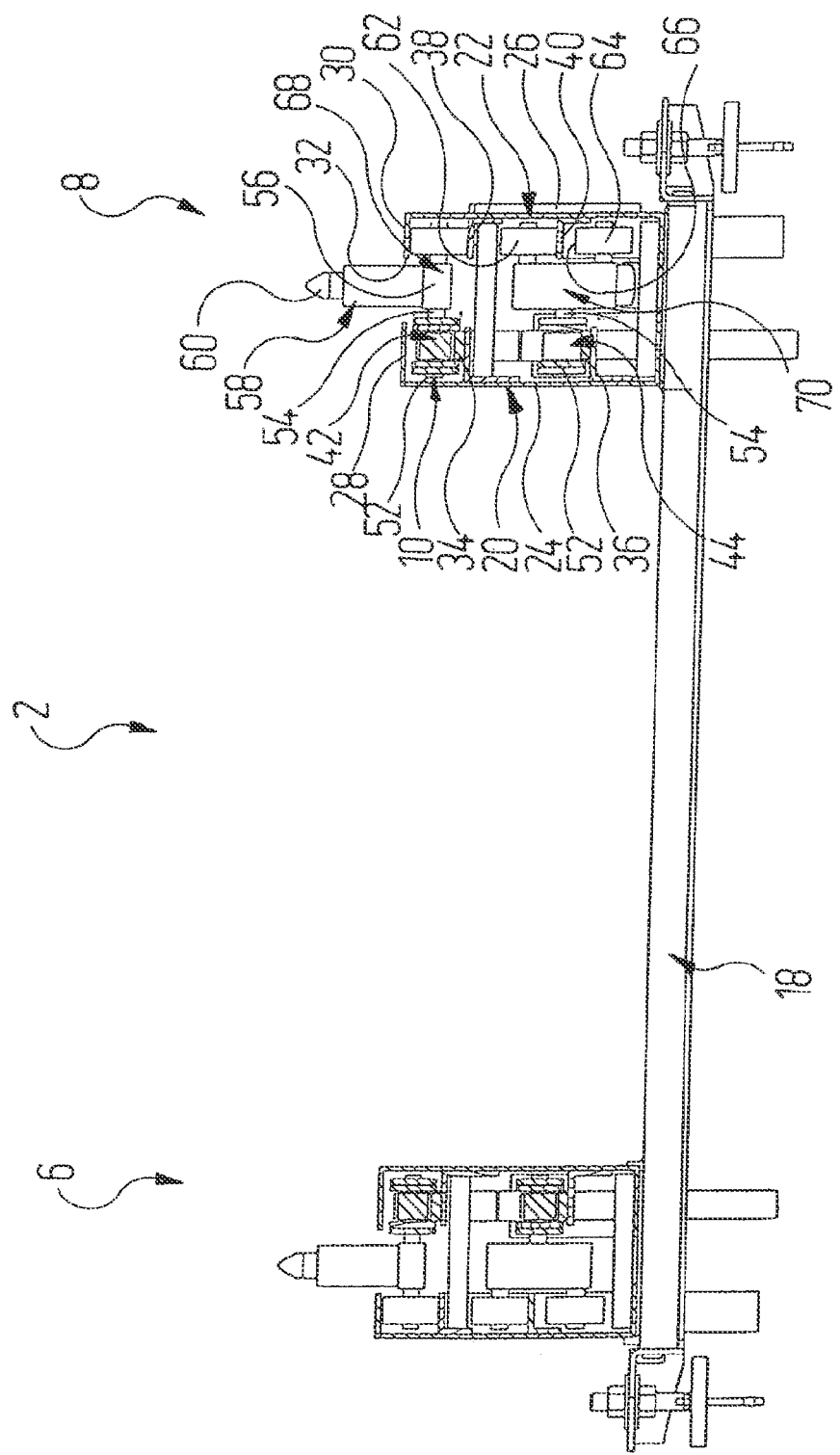
FIG. 3 a section on an enlarged scale of the carrying-chain conveyor along the section line III-III in FIG. 1.
Figure 12:
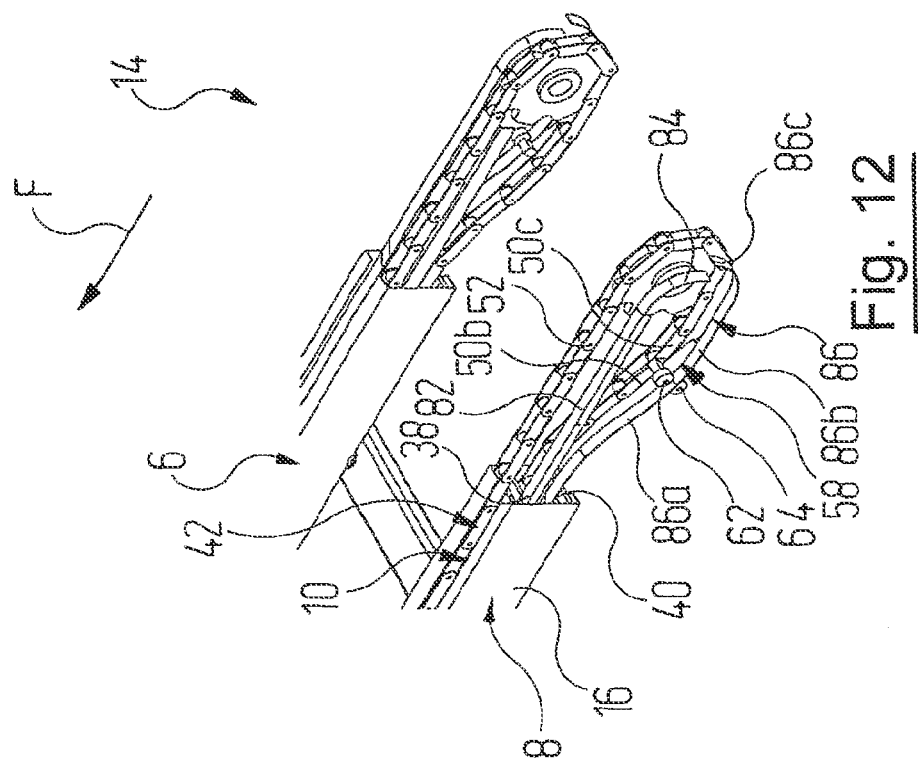
Figure 11:
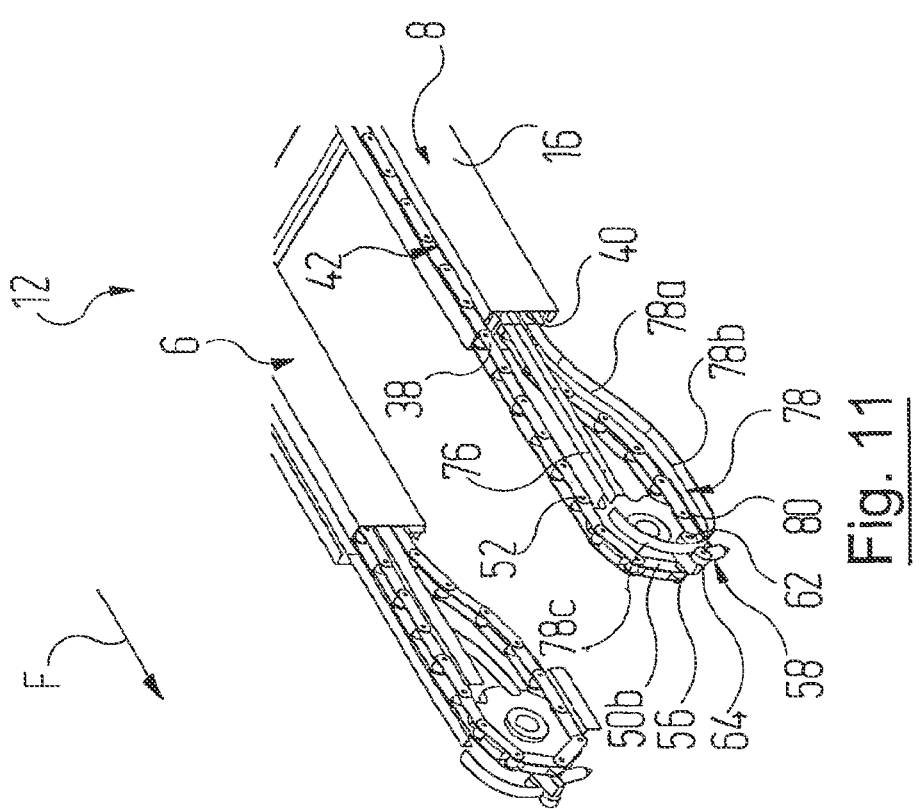

Mounted on the inner surface of the vertical portion 24 of the first side plate 20, which is on the left in FIG. 3, are two horizontal intermediate floors 34, 36 which face in the direction of the second side plate 22, which is on the right in FIG. 3. The inner surface of the vertical portion 26 of the second side plate 22 also supports two horizontal intermediate floors which are denoted by 38 and 40 and face in the direction of the left side plate 20.

The two upper intermediate floors 34 and 38 of the side plates 20, 22 in each case are located in a common horizontal plane. However, of the two lower intermediate floors 36 and 40 in each case, the intermediate floor 36 on the first side plate 20 is arranged higher than the intermediate floor 40 on the second side plate 22. This is discussed again further below.

A respective clearance also remains between the two upper intermediate floors 34 and 38 of the side plates 20, 22 and between the two lower intermediate floors 36 and 40. These clearances overlap with the upper longitudinal slot 32 of the guide profile 16 in the vertical direction.

The conveyor chain 10 provides a load-carrying strand 42 and a return strand 44, wherein the load-carrying strand 42 in the present exemplary embodiment lies on the upper intermediate floor 38 of the second side plate 22, whilst the return strand 44 is guided on the lower intermediate floor 40 of the second side plate 22. The load-carrying strand 42 and the return strand 44 of the conveyor chain 10 extend between a deflection pinion 46 at the drive end 12 and a deflection pinion 48 at the bearing end 14 of the drive unit 8. The deflection pinions 46 and 48 are each mounted such that they are rotatable about a horizontal axis of rotation so that the conveyor chain 10 revolves in a vertical plane in each case. The deflection pinion 46 at the drive end 12 can be driven in a manner known per se and is coupled to the corresponding deflection pinion of the drive unit 8 so that the conveyor chain 10 of the drive unit 8 and the conveyor chain 10 of the drive unit 6 revolve in synchronised manner. With the support pins 58, the two load-carrying strands 42 of the two conveyor chains 10 of the drive units 6 and 8 form a conveying plane in which the vehicle bodies 4 are conveyed, which extends horizontally in the present exemplary embodiment.

Figure 2:
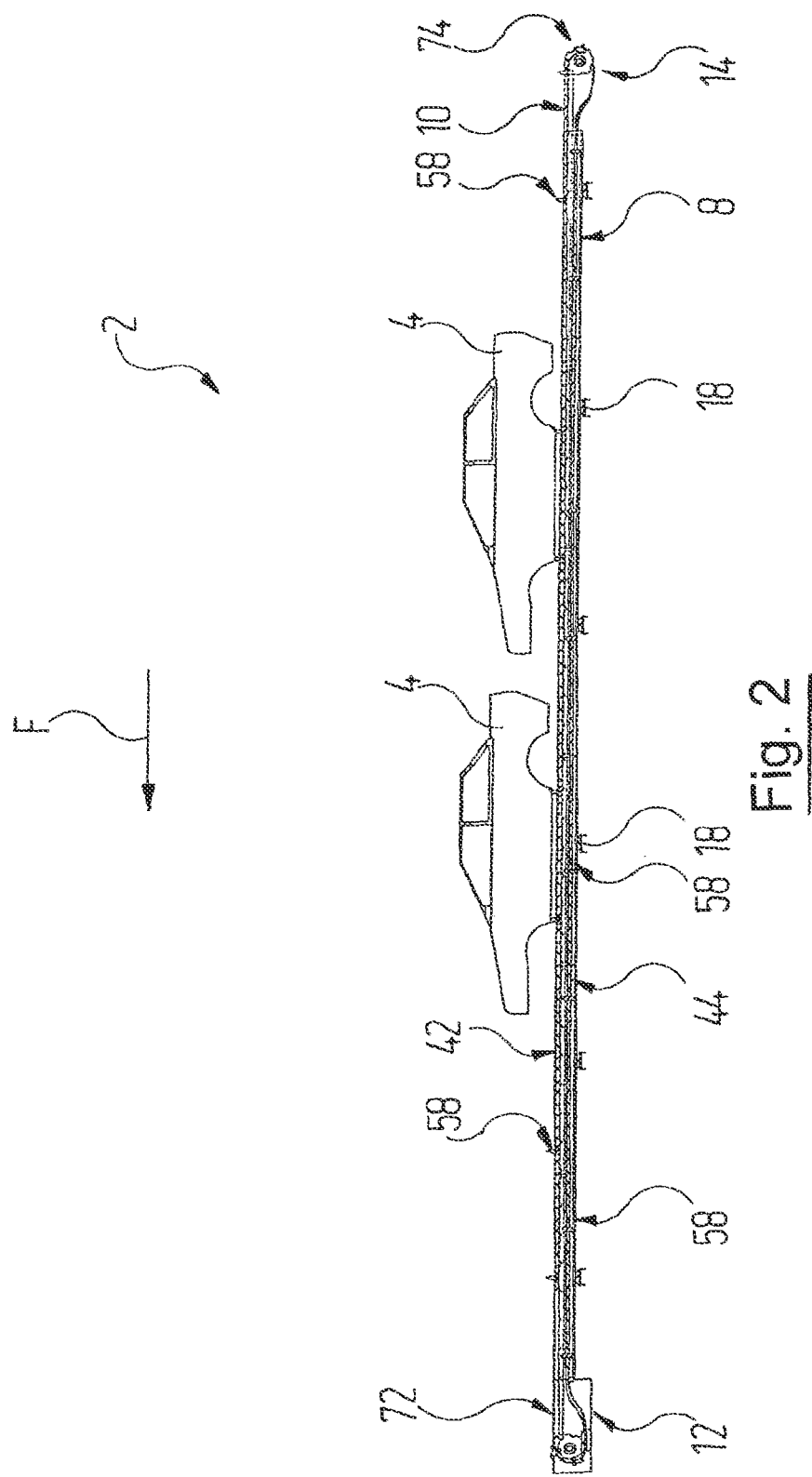
FIG. 2 a view corresponding to FIG. 1 of the carrying-chain conveyor, wherein side plates of a guide profile shown in FIG. 1 and a cover of the drive end are omitted.

The conveyor chain 10 comprises a plurality of chain elements 50, which are connected in articulated manner to one another in a manner known per se by means of freely rotatable axle pins 52. Not all of the axle pins 52 are provided with a reference numeral in the figures. In FIGS. 1, 2 and also 4 and 6, some chain elements 50 on the drive end 12 and on the respective bearing end 14 are not shown in each case.

In the case of particular pairs of adjacent chain elements 50a, 50b, the respective axle pin 52 merges in the direction pointing away from the drive unit 8 into an axle journal 54 which thus projects laterally away from the conveyor chain 10.

The axle journal 54 is connected in rotationally fixed manner to a rotating block 56 at its end which is remote from the conveyor chain 10. As a coupling element for the vehicle body 4, this rotating block carries a support pin 58 whereof the longitudinal axis extends perpendicularly to the axis of the axle journal 54. At that end of the support pin 58 which is remote from the axle journal 54, there is a bearing cone 60 which is adapted in terms of its dimensions to the vehicle bodies 4 to be conveyed in such a way that it can cooperate with one of the standardised holding components of the vehicle body 4 and can engage, particularly in certain areas, in a through-opening provided for this. The number of chain elements 50 between two adjacent axle journals 54 associated with a particular vehicle body 4 and two adjacent support pins 58 is always the same and is selected so that two adjacent support pins 58 match two corresponding holding components of the vehicle body 4. The spacing between two such pairs of support pins 58 on a conveyor chain 10 can be altered in the course of the service life of the conveyor chain 10, possibly by removing chain elements, in order to account for changes in position of the conveyor chain 10 which occur during its operation. In FIGS. 4 and 6, two support pins 58 are shown at a slight spacing in each case so as to better illustrate a tilting and righting procedure explained below.

A respective support pin 58 of each conveyor chain 10 should essentially engage in a holding component of the vehicle body 4. Instead of the bearing cone 60, each second support pin 58 of each conveyor chain 10 can carry a support plate on which the vehicle body 4 can be supported for example by its respective door sill. It is thus possible to compensate manufacturing tolerances of the vehicle body 4 or the above-mentioned changes in position of the conveyor chains 10.

On its side which is remote from the conveyor chain 10, the rotating block 56 supports a first rotatable roller 62 and a second rotatable roller 64 whereof the axes of rotation extend parallel to the axis of the associated axle journal 54 and are located in a common plane with this. A clearance 66 remains between the two rollers 62 and 64.

An upper guide channel 68 for the load-carrying strand 42 is constructed between the angled flange 30 and the upper intermediate floors 34 and 38 of the guide profile 16 and a lower guide channel 70 for the return strand 44 of the conveyor chain 10 is constructed below the two upper intermediate floors 34 and 38. This is shown in FIG. 3.

As likewise shown there and in FIG. 5, the load-carrying strand 42 of the conveyor chain 10 runs through the upper guide channel 68 in such a way that the support pins 58 extend vertically upwards from the rotating block 56 through the longitudinal slot 32 of the guide profile 16. The respective bearing cone 60 of each support pin 58 is located at the top here.

With this, the chain elements 50 slide along the upper intermediate floor 36 of the first side plate 20 and the rollers 62 and 64 on the rotating block 56 run along the upper intermediate floor 38 of the second side plate 22. The first roller runs ahead of the second roller 64 here in the conveying direction F. This arrangement of the rollers 62 and 64 behind one another in the running direction prevents the support pin 58 from tilting about the axis of the axle journal 54 as the conveyor chain 10 advances.

In the lower guide channel 70, however, the return strand 44 of the conveyor chain 10 runs in such a way that the support pins 58 are tilted through 90° with respect to their vertical position on the load-carrying strand 42 and face in the opposite direction to the conveying direction F. Their longitudinal axis here is located substantially in a horizontal plane.

During this, the chain elements 50 slide along the lower intermediate floor 36 of the first side plate 20. The first roller 62 on the rotating block 56 runs along the lower intermediate floor 40 of the second side plate 22, whereas the second roller 64 is carried along freely below the lower intermediate floor 40 by the rotating block 56. The intermediate floor 40 here is therefore arranged in the clearance 66 between the two rollers 62, 64 on the rotating block 56.

In order to bring about an appropriate position of the support pins 58 on the load-carrying strand 42 and on the return strand 44 of the conveyor chain 10 during the revolution of the conveyor chain 10, a tilting device 72 is present at the drive end 12 of the drive unit 8 and a righting device 74 is present at the bearing end 14 of the drive unit 8.

The tilting device 72 is shown particularly clearly in FIGS. 4, 7, 9 and 11. The tilting device 72 comprises a first floor end portion 76 of the upper intermediate floor 38 on the second side plate 22, which extends linearly beyond the side plate 22 of the guide profile 16. Moreover, the tilting device 72 comprises a curved guide track 78 into which the lower intermediate floor 40 on the second side plate 22 merges. With this, the lower intermediate floor 40 firstly leads into a rail portion 78a with a downward slope in the conveying direction F, which merges into a rail portion 78b which is again horizontal. Adjoining this is a curved arcuate rail portion 78c, which describes an approximate semi-circle along an imaginary circle whereof the centre axis is coaxial to the centre axis of the deflection pinion 46.

The elevation of the horizontal rail portion 78b, the course of the arcuate rail portion 78c and the arrangement and geometry of the deflection pinion 46 are matched to one another in such a way that, when the conveyor chain 10 is tensioned, the arcuate rail portion 78c follows approximately the course of the axle journal 54 about the deflection pinion 46.

The arcuate rail portion 78c ends at the upper apex of its underlying imaginary circle. The first floor portion 76 of the upper intermediate floor 38 on the second side plate 22 extends only so far in the direction of the free end of the arcuate portion 78c of the guide track 78 for a gap to remain which is somewhat greater than the diameter of the rollers 62 and 64 on the rotating block 56.

The tilting device 72 further comprises a running floor 80 for the conveyor chain 10, which merges into the lower intermediate floor 36 on the first side plate 20. The running floor 80 likewise has a downward slope in the conveying direction F; accordingly, with respect to the normal running direction of the return strand 44 of the conveyor chain 10, and therefore in the opposite direction to the conveying direction F, the running floor 80 has an upward slope. By way of the running floor 80, the chain elements 50 of the conveyor chain 10 which run from the deflection pinion 46 at the drive end 12 of the drive unit 8 arrive at the lower intermediate floor 36 on the first side plate 20 of the guide profile 16.

The righting device 74 is shown particularly clearly in FIGS. 6, 8, 10 and 12. The righting device 74 comprises a second floor portion 82 of the upper intermediate floor 38 on the second side plate 22, which extends linearly beyond the side plate 22 in the opposite direction to the conveying direction F. At its end which is remote from the intermediate floor 38, this floor portion supports a guide rail 84 which is curved downwards and describes an approximate quarter circle along an imaginary circle. The free end of the guide rail 84 lies approximately centrally between the clear outer contour and the centre axis of the deflection pinion 48 and is located approximately at the height of its centre axis.

The righting device 74 further comprises a curved guide track 86 into which the lower intermediate floor 40 on the second side plate 22 merges. With this, the lower intermediate floor 40 once again leads into a rail portion 86a with a downward slope, although this points in the opposite direction to the conveying direction F. The rail portion 86a then merges into a rail portion 86b which is again horizontal. Adjoining this, there is again an upwardly curved arcuate rail portion 86c which describes a quarter circle along an imaginary circle whereof the centre axis is coaxial to the centre axis of the deflection pinion 46. The free end of the arcuate rail portion 86c lies radially outside, adjacent to the free end of the guide rail 84. This leaves a gap which is somewhat greater than the diameter of the rollers 62 and 64 on the rotating block 56.

The elevation of the horizontal rail portion 86b, the course of the arcuate rail portion 86c and the arrangement and geometry of the deflection pinion 48 at the bearing end 14 are matched to one another in such a way that, when the conveyor chain 10 is tensioned, the arcuate rail portion 86c follows approximately the course of the axle journal 54 about the deflection pinion 48.

The righting device 74 further comprises a running floor 88 which merges into the lower intermediate floor 36 at the first side plate 20 and has an upward slope in the conveying direction F. By way of the running floor 88, the chain elements 50 of the conveyor chain 10, which run from the deflection pinion 48 at the bearing end 14 of the drive unit 8, are guided to the lower intermediate floor 36 on the first side plate 20 of the guide profile 16.

At both the drive end 12 and the bearing end 14 of the drive unit 8, the upper intermediate floor 34 of the guide profile 16 along which the conveyor chain 10 runs extends horizontally beyond the first side plate 20 and continues in each case until it is a short distance in front of the deflection pinion 46 or the deflection pinion 48 respectively.

The carrying-chain conveyor 2 now functions as follows:

With the aid of conveyor means (which are not of further interest here) at the bearing end 14 of the drive units 6 and 8, a vehicle body 4 is placed on support pins 58, or on their bearing cones 60, of the load-carrying strand 42 of the conveyor chain 10 which project vertically upwards out of the guide profiles 16. The vehicle body 4 can be placed immediately and directly on the support pins 58 without the need for a carrying structure such as a skid.

The load to be carried is transferred from the support pins 58 to the conveyor chain 10 and the rollers 62, 64 by way of the rotating block 56 and received by the upper intermediate floors 34 and 38 of the guide profile 16. The deflection pinions 46 are driven at the respective drive end 12 of the drive units 6 and 8 and the vehicle body 4 is conveyed in the conveying direction F.

During this, the load-carrying strand 42 of each conveyor chain 10 slides on the upper intermediate floor 34 and the rollers 62, 64 on the rotating block 56 run on the upper intermediate floor 38 of the respective guide profile 16. After the vehicle body 4 has been conveyed its predetermined distance, it is removed from the carrying-chain conveyor 2 again in a manner known per se.

During the revolution of the conveyor chain 10, a pair of chain elements 50a, 50b of the load-carrying strand 42, which are coupled to a support pin 58, arrives at the tilting device 72. The rollers 62, 64 firstly run on the floor portion 76 there to its free end. This is shown in FIG. 7.

If the leading roller 62 on the rotating block 56, as seen in the conveying direction F, is now moved beyond the free end of the floor end portion 76, it arrives in the clearance between the floor end portion 76 and the arcuate rail portion 78c of the guide track 78. The following roller on the rotating block 56, as seen in the conveying direction F, is still supported by the floor end portion 76, as a result of which the support pin 58 tilts about the axis of the axle pin 52 with the axle journal 54 in the conveying direction F. With this, the free end of the arcuate rail portion 78c of the guide track 78 runs into the clearance 66 between the rollers 62 and 64 on the rotating block 56. This is shown in FIG. 9.

As the conveyor chain 10 revolves further, the rotating block 56 is guided through the guide track 78 so that the support pin 58 follows its course and is thereby always aligned approximately tangentially with respect to the guide track 78. This can be seen in FIG. 11.

Finally, the support pin 58 arrives in the guide profile 16 in an idle position in which it is aligned horizontally, as shown in FIGS. 3 and 5.

If the conveyor chain 10 revolves further, the support pin 58 finally arrives at the righting device 74 at the bearing end 14 of the drive unit 6 and 8. The roller 62 on the rotating block 56 advances onto the guide track 86 here so that it is arranged between the rollers 62 and 64. This can be seen in FIG. 12.

The support pin 58 thus follows the course of the guide track 86 and is also always aligned approximately tangentially with respect to this here.

FIG. 10 shows a phase of the revolution of the conveyor chain 10, in which the rotating block 56 with the support pin 58 arrives in the region between the free ends of the arcuate rail portion 86c of the guide track 86 and the guide rail 84.

The first roller 62 on the rotating block 56 firstly runs along the guide rail 84 here. When the second roller 64 on the rotating block 56 loses contact with the arcuate rail portion 86c of the guide track 86, the support pin 58 can tilt so that both rollers 62, 64 on the rotating block 56 finally roll along the guide rail 84. As the conveyor chain 10 revolves further, the rollers 62, 64 then run on the second floor end portion 82 of the upper intermediate floor 38 on the second side plate 22, so that the support pin 58 projects vertically upwards, which defines its operating position.

As a result of the guide track 78 of the tilting device 72 and the guide rail 84 and the guide track 86 of the righting device 74, the support pins 58 therefore carry out the necessary tilting movement in positively driven manner so that they are moved out of the operating position on the load-carrying strand 42 into the idle position on the return strand 44 of the conveyor chain 10—and vice versa.

Figure 13:
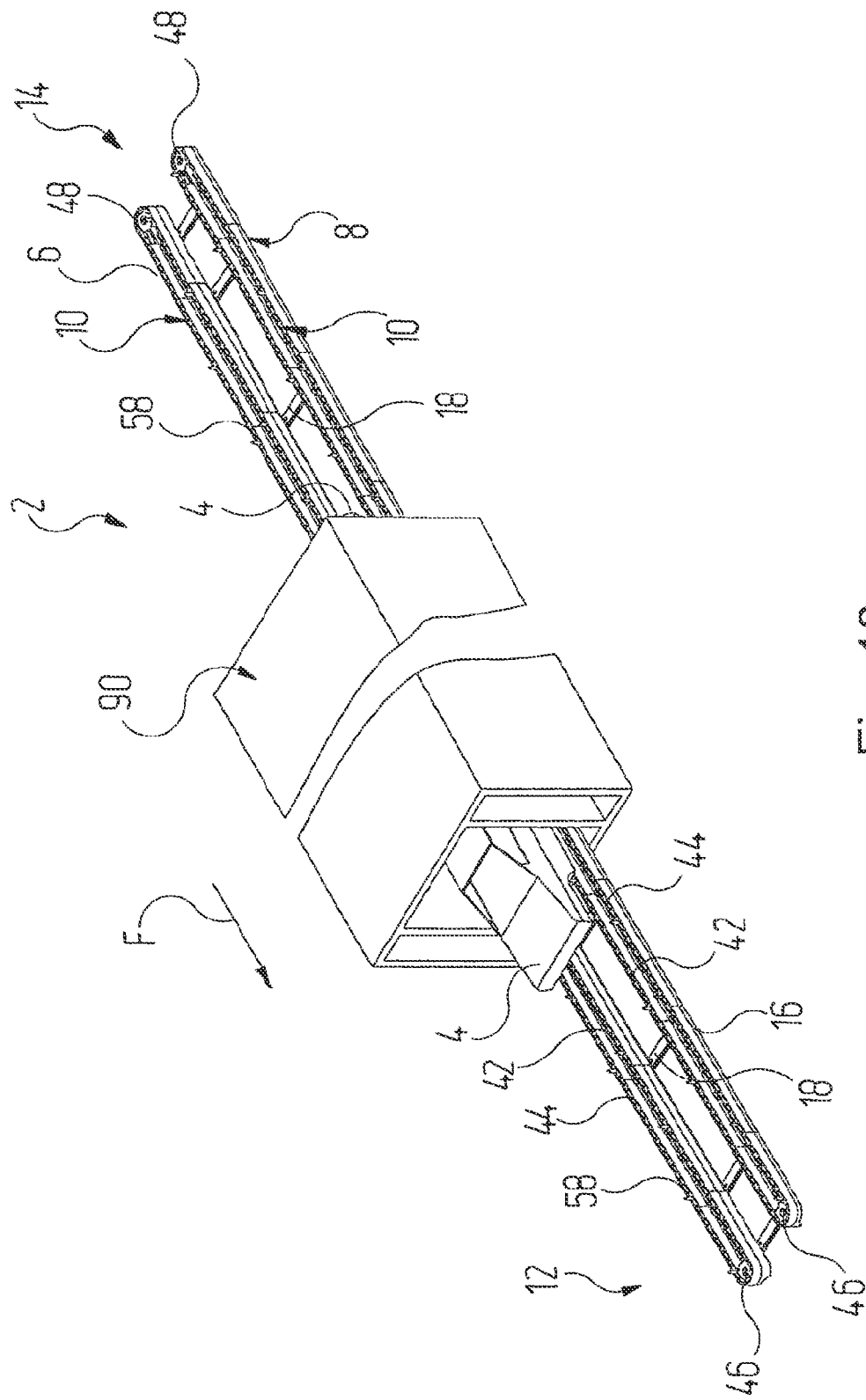
FIG. 13 a carrying-chain conveyor as a second exemplary embodiment with non-tiltable vertical support pins in a perspective view.
Figure 14:
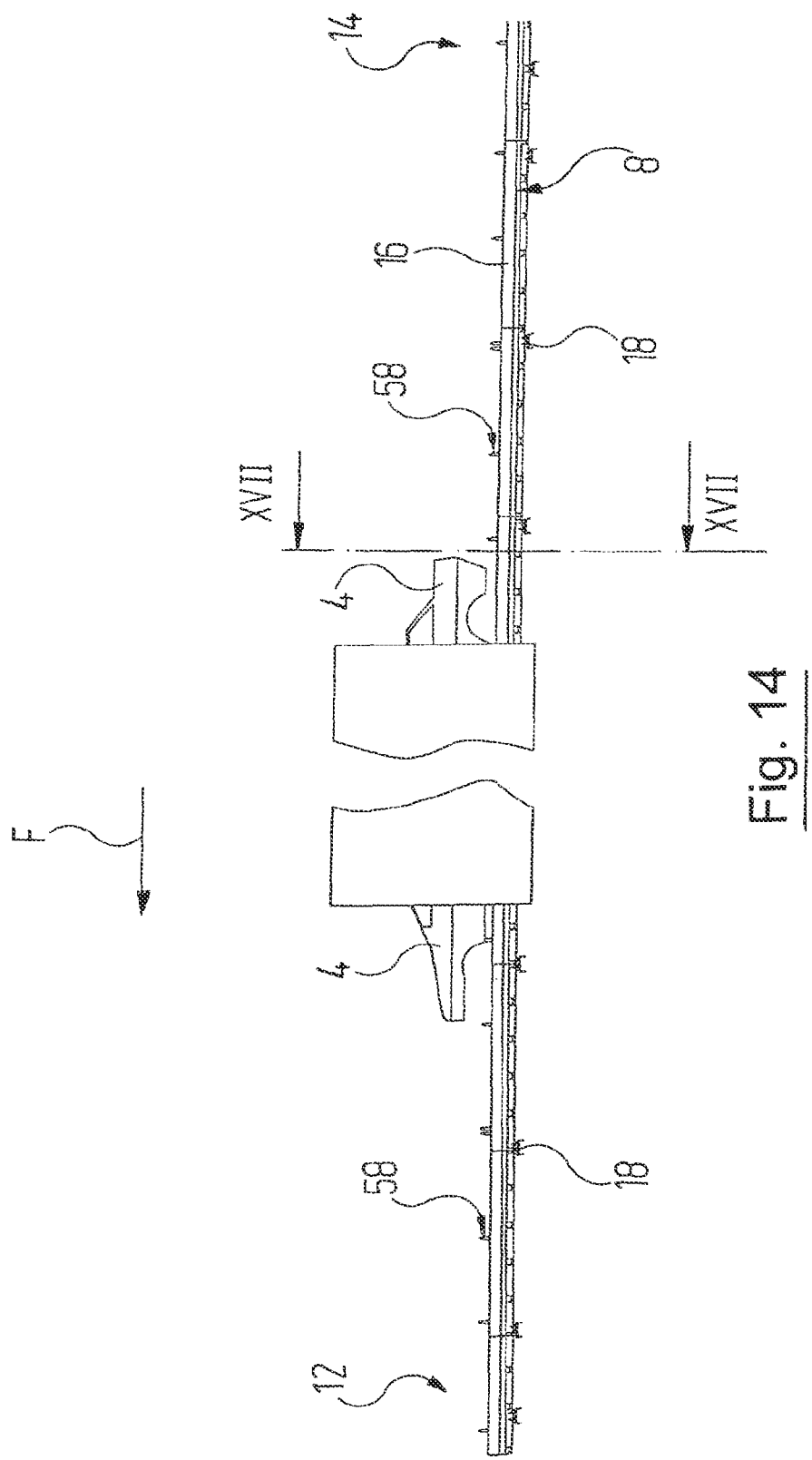
FIG. 14 a side view corresponding to FIG. 1 of the carrying-chain conveyor of FIG. 13.
Figure 15:
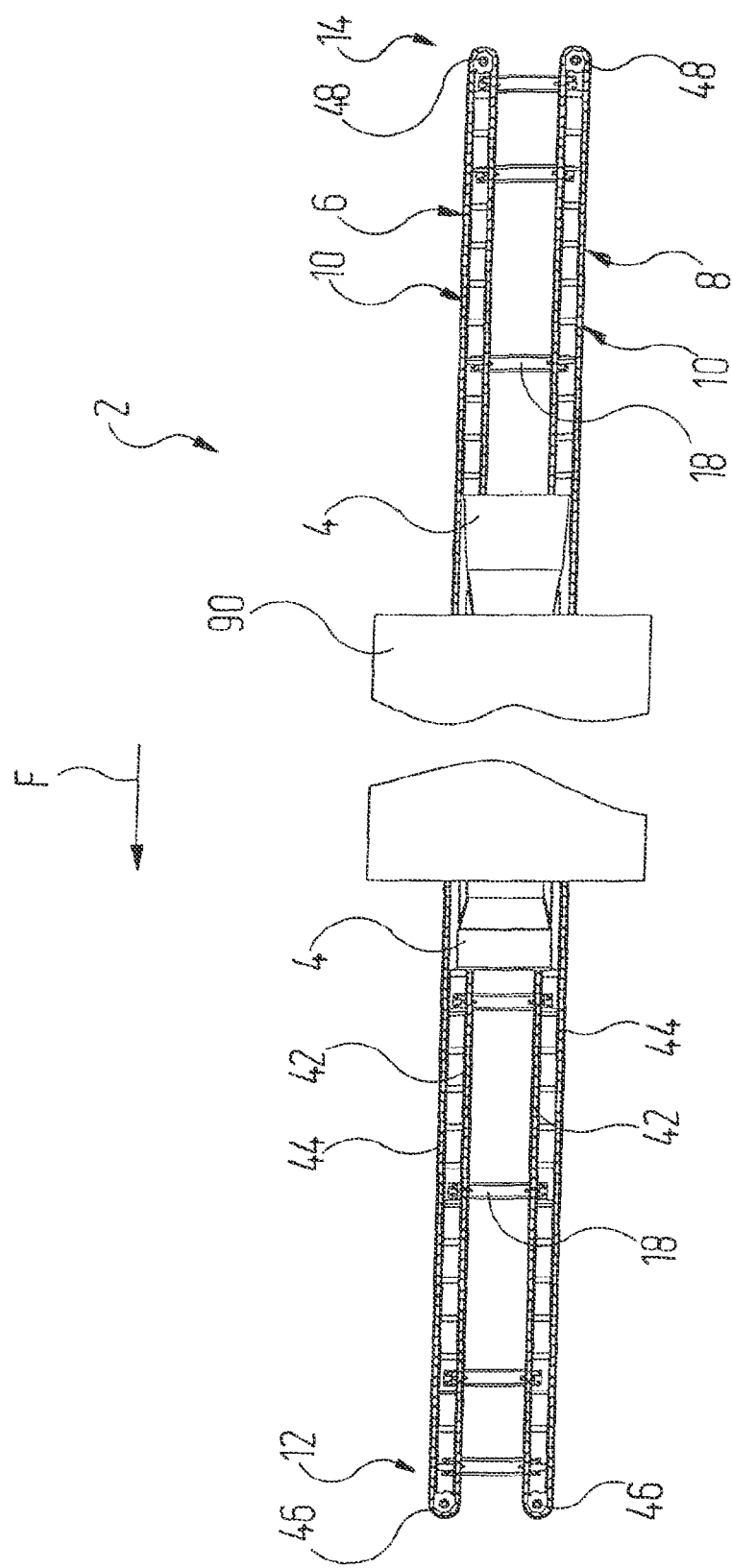
FIG. 15 a view from above of the carrying-chain conveyor of FIGS. 13 and 14.
Figure 16:
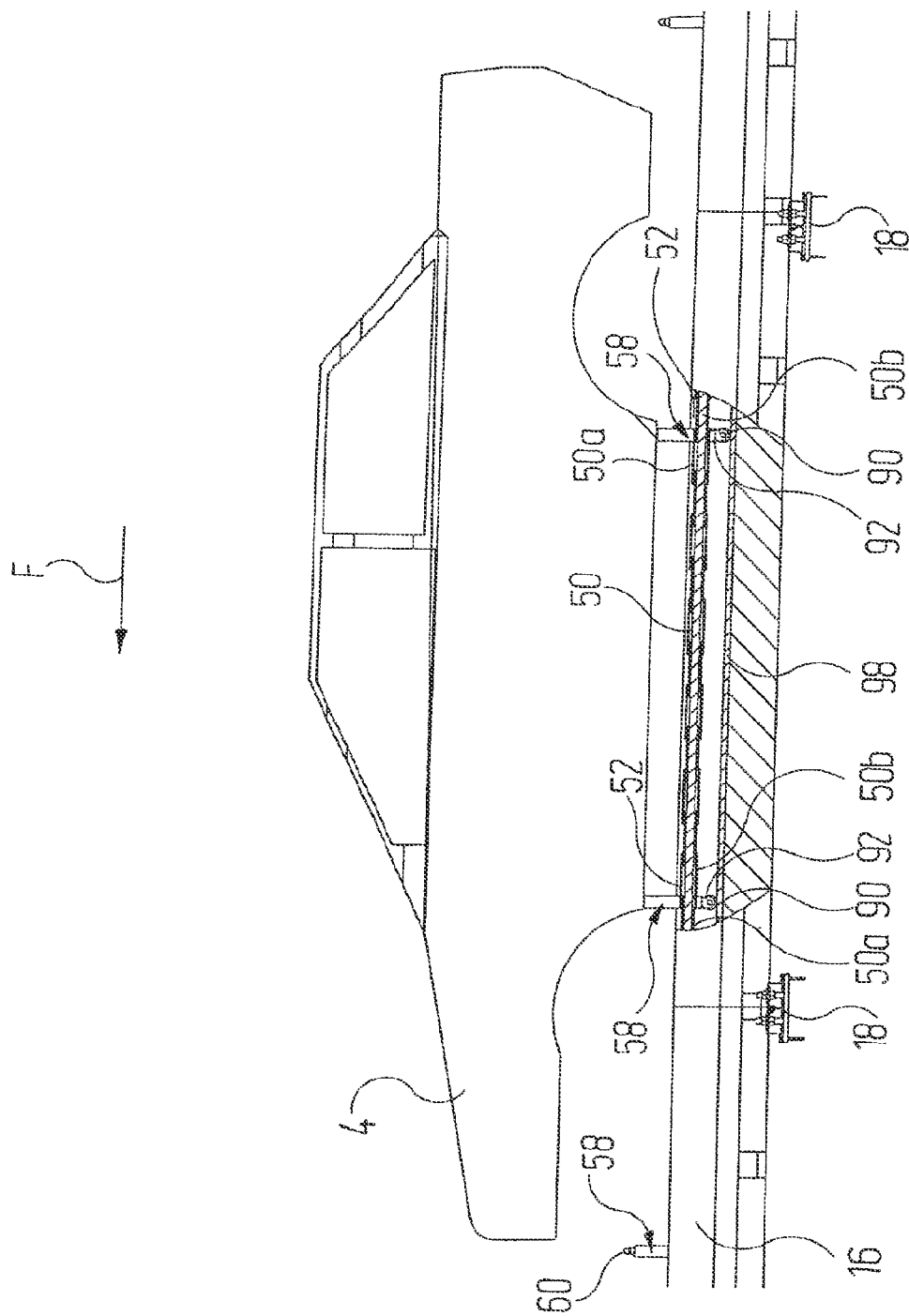
Figure 17:
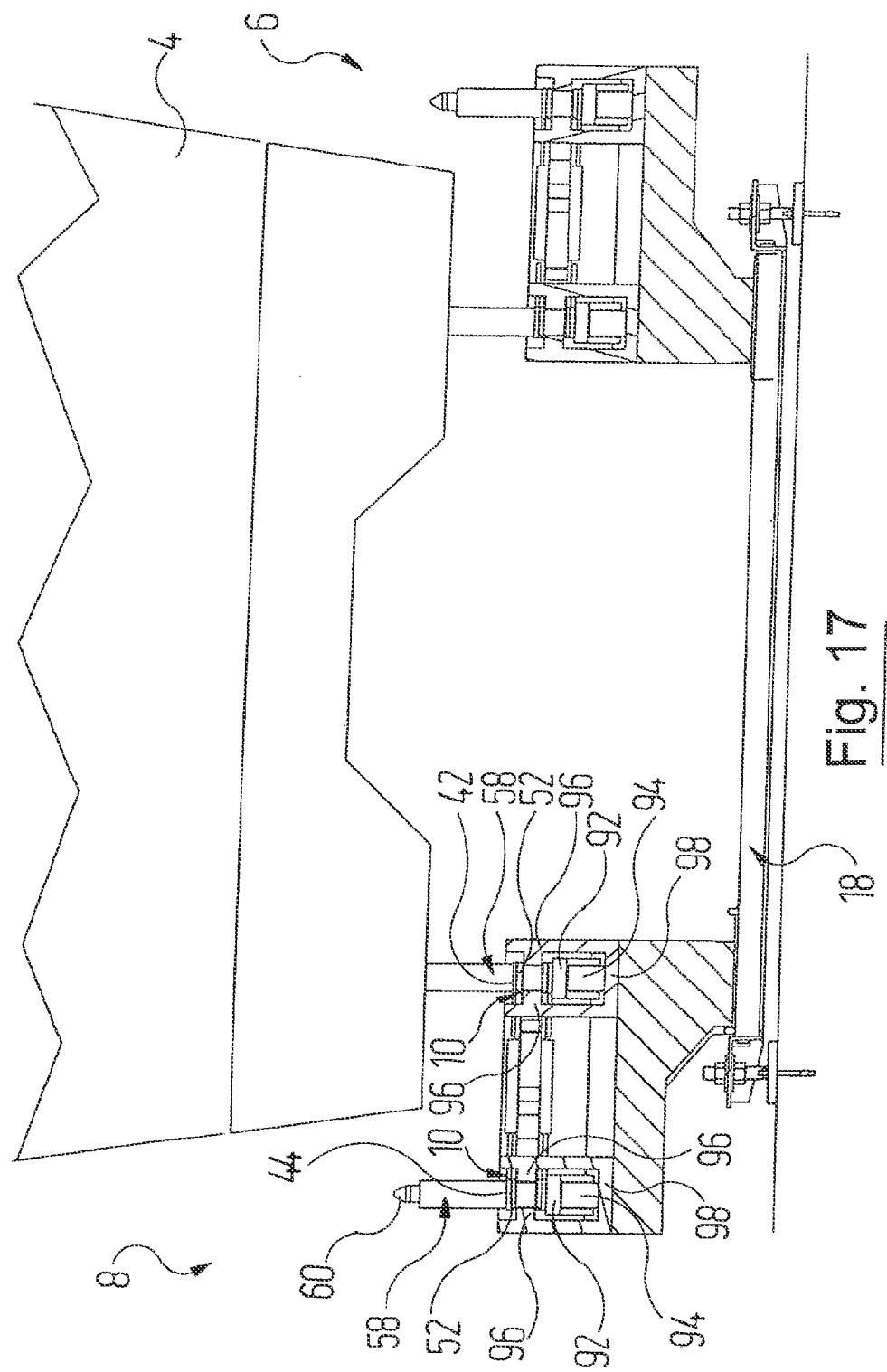
FIG. 17 a section on an enlarged scale of the carrying-chain conveyor along the second line XVII-XVII in FIG. 14.

FIGS. 13 to 17 show a carrying-chain conveyor 2' as a second exemplary embodiment. In these, components which correspond to those of the carrying-chain conveyor 2 according to FIGS. 1 to 12 have the same reference numerals. FIGS. 13 to 15 show a schematic view of a drier 90 through which a vehicle body 4 shall pass.

Contrary to the carrying-chain conveyor 2, the deflection pinions 46 and 48 are mounted such that they are rotatable about a vertical axis of rotation rather than a horizontal axis of rotation, so that the conveyor chains 10 revolve in a horizontal plane in each case. The respective load-carrying strand 42 of the two conveyor chains 10 of the drive units 6, 8 extend parallel to one another and lie opposite one another. The respective deflection pinions 46 and 48 of the drive units 6 and 8 therefore rotate in opposite directions of rotation, as a result of which the two load-carrying strands 42 are driven in the same conveying direction F.

The support pins 58 with the bearing cone 60 are rigidly connected on the upper side of the conveyor chain 10 to a respective axle pin 52 between two chain elements 50a, 50b and extend coaxially to said axle pin. In other words, in the case of the carrying-chain conveyor 2', the axle pins 52 between chain elements 50a, 50b merge into the support pins 58 on the upper side of the conveyor chain 10.

On the underside of the conveyor chain 10, which is remote from the support pin 58, the respective axle pin 52 is rigidly connected to a roller bearing 92 which supports a load-bearing roller 94 which is rotatable about a horizontal axis. The roller 94 is therefore carried along by the conveyor chain 10 and supports this at the bottom.

The guide profile 16 of the drive units 6 and 8 comprises horizontal lateral guide tracks 96 for each strand, which extend between the deflection pinions 46 and 48 and flank the chain elements 150. The rollers 94 roll along a revolving horizontal floor running rail 98 which is arranged vertically below the conveyor chain 10 and follows its course.

As a result of the free rotatability of the axle pins 52, the rollers 94 are readily righted through the movement of the conveyor chain 10 by the friction against the floor running rail 98, so that the deflection of the conveyor chain 10 at the deflection pinions 46 and 48 takes place without difficulty.

As a result of both the tilting and righting devices 72 and 74 and the horizontal alignment of the support pins 58 of the return strand 144 of the conveyor chains 10 in the case of the carrying-chain conveyor 2, as well as the horizontal revolution of the conveyor chains 10 with continuously vertically aligned support pins 58 in the case of the carrying-chain conveyor 2', the necessary overall height of the respective drive units 6 and 8 can be kept relatively small in spite of the support pins 58 projecting relatively far from the respective conveyor chain 10.

In the exemplary embodiment shown in FIGS. 13 to 17, the respective load-carrying strand 42 of each conveyor unit 6, 8 runs on the inside and the associated return strand 44 runs on the outside. In a modification which is not shown specifically, the mutual spacing between the conveyor units 6 and 8 is reduced in such a way that the strand of the conveyor chains 10 which is now located on the outside in each case receives the vehicle body 4 and the return strand then runs on the inside below the vehicle body 4.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A device for conveying vehicle bodies, on which standardised holding components are present, the device comprising:
   a) at least one continuous drive train which includes a load-carrying strand and a return strand;
   b) a guide device for the at least one continuous drive train, which comprises a first deflection element and at least one second deflection element by way of which the at least one continuous drive train revolves,
   wherein
   c) the at least one continuous drive train carries a plurality of coupling elements which are arranged and configured such that they are capable of cooperating with the standardised holding components of the vehicle body
   wherein
   d) the plurality of coupling elements are connected to the continuous drive train such that the coupling elements are tiltable about an axis;
   e) a tilting device at a first end of the continuous drive train which tilts the plurality of coupling elements from an operating position into an idle position which is tilted in comparison to the operating position; and,
      a righting device at a second end of the continuous drive train tilts the plurality of coupling elements from the idle position into the operating position,
      such that
      the plurality of coupling elements are carried along by the load-carrying strand in the operating position and by the return strand in the idle position.

2. The device according to claim 1, comprising: at least two continuous drive trains, whereof the load-carrying strands extend parallel to one another and form a conveying plane with the coupling elements.

3. The device according to claim 1, wherein the coupling elements extend vertically upwards beyond the continuous drive train, at least in the region of the load-carrying strand of the continuous drive train.

4. The device according to claim 1, wherein the coupling elements comprise support pins.

5. The device according to claim 1, wherein the tilting axis of the coupling elements extends horizontally and perpendicularly to a direction of revolution when the device is in operation, and the tilting device and the righting device comprise rail elements which allows for the coupling elements to carry out the tilting movement in positively driven manner.

* * * * *